(12) United States Patent
Mavrosakis et al.

(10) Patent No.: US 11,473,588 B2
(45) Date of Patent: Oct. 18, 2022

(54) TREATMENT PROCESS FOR A CENTRAL BORE THROUGH A CENTRIFUGAL COMPRESSOR WHEEL TO CREATE A DEEP CYLINDRICAL ZONE OF COMPRESSIVE RESIDUAL HOOP STRESS ON A FRACTIONAL PORTION OF THE BORE LENGTH, AND COMPRESSOR WHEEL RESULTING THEREFROM

(71) Applicant: Garrett Transportation I Inc., Torrance, CA (US)

(72) Inventors: Peter Mavrosakis, Torrance, CA (US); Franklin Allen, Torrance, CA (US); Petr Skara, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 249 days.

(21) Appl. No.: 16/861,158

(22) Filed: Apr. 28, 2020

(65) Prior Publication Data

US 2020/0400158 A1 Dec. 24, 2020

Related U.S. Application Data

(60) Provisional application No. 62/865,314, filed on Jun. 24, 2019.

(51) Int. Cl.
*F04D 29/28* (2006.01)
*B23P 9/02* (2006.01)

(52) U.S. Cl.
CPC ............ *F04D 29/284* (2013.01); *B23P 9/025* (2013.01); *F05B 2230/20* (2013.01)

(58) Field of Classification Search
CPC ...... F04D 29/284; F04D 29/28; F04D 29/282; F04D 29/286; F04D 17/08; B23P 9/025; F05B 2230/20
See application file for complete search history.

(56) References Cited

U.S. PATENT DOCUMENTS

| 4,665,732 A | 5/1987 | Hogenhout |
| 4,885,829 A | 12/1989 | Landy |
| 6,164,931 A | 12/2000 | Norton et al. |

(Continued)

FOREIGN PATENT DOCUMENTS

| EP | 0086505 A1 | 8/1983 |
| EP | 1611976 A1 | 4/2006 |

(Continued)

OTHER PUBLICATIONS

Extended European Search Report for EP Appl. No. 20179183.7-1016, dated Nov. 19, 2020.

*Primary Examiner* — Brian P Wolcott
*Assistant Examiner* — Joshua R Beebe
(74) *Attorney, Agent, or Firm* — John C. James

(57) ABSTRACT

A process for cold working of the inner surface of a bore in a centrifugal compressor wheel along only a fractional portion of the bore length (i.e., along less than a full axial length of the bore), thereby creating a zone of compressive residual hoop stress in the metal surrounding the bore where the wheel needs the beneficial residual stress. The process purposefully avoids cold working of the bore at locations adjacent to high-stress areas and features of the wheel, where cold working in such locations could negatively impact the wheel's overall life.

4 Claims, 8 Drawing Sheets

(56) References Cited

U.S. PATENT DOCUMENTS

| | | | |
|---|---|---|---|
| 6,935,021 B2 * | 8/2005 | Ruetz | B23P 9/00 29/889.6 |
| 6,994,526 B2 | 2/2006 | Furman et al. | |
| 7,464,577 B2 | 12/2008 | Habedank et al. | |
| 9,744,628 B1 * | 8/2017 | Kuo | C21D 7/02 |
| 2003/0136001 A1 | 7/2003 | Nishiyama et al. | |
| 2003/0177800 A1 | 9/2003 | Ruetz | |
| 2006/0000089 A1 * | 1/2006 | Habedank | F01D 5/286 416/168 A |
| 2013/0260168 A1 | 10/2013 | Slavik et al. | |
| 2015/0198163 A1 * | 7/2015 | Lei | F04D 29/685 415/207 |
| 2018/0281134 A1 * | 10/2018 | Hagan | B21K 1/36 |

FOREIGN PATENT DOCUMENTS

| | | | |
|---|---|---|---|
| JP | S63131802 * | 3/1988 | F01D 5/06 |
| JP | S63131802 A | 3/1988 | |
| JP | 201217713 A | 1/2012 | |
| WO | 200218092 A1 | 7/2002 | |
| WO | WO-2012139874 A1 * | 10/2012 | B23P 9/00 |

* cited by examiner

TREATMENT PROCESS FOR A CENTRAL BORE THROUGH A CENTRIFUGAL COMPRESSOR WHEEL TO CREATE A DEEP CYLINDRICAL ZONE OF COMPRESSIVE RESIDUAL HOOP STRESS ON A FRACTIONAL PORTION OF THE BORE LENGTH, AND COMPRESSOR WHEEL RESULTING THEREFROM

BACKGROUND OF THE INVENTION

This application relates generally to centrifugal compressor wheels, such as for use in turbochargers for internal combustion engines.

Typically, the life-limiting mode of a centrifugal compressor wheel is a low-cycle fatigue (LCF) failure mode emanating from a crack that starts at or near the surface of the through bore of the wheel.

SUMMARY OF THE DISCLOSURE

An objective of the present technical developments, which led to the invention herein described, is to improve the LCF life of a centrifugal compressor wheel having a through-bore, that is, a central bore extending entirely through the wheel along the axis of rotation.

A treatment process in accordance with embodiments of the invention requires intimate knowledge of the stresses of the compressor wheel to pre-fabricate the conditions for achieving a partial-bore cold working treatment. Embodiments of the invention described herein relate to a high-speed centrifugal impeller or wheel, which has high stresses on the impeller bore, impeller blade root fillets, and impeller back disk. In many of these high-speed impellers, the shape of the hub-line (from starting point to ending point of the bore) presents additional challenges to applying the invention because of variable wall thickness around the impeller bore and high stress features adjacent to the wall areas surrounding the bore. At these junctions, deleterious overlapping stresses can substantially reduce the benefit of cold working, if the cold working is applied without the accommodations provided for by this invention.

The present disclosure describes a process involving cold working of the inner surface of the bore along only a fractional portion of the bore length (i.e., along less than a full axial length of the bore), thereby creating a zone of compressive residual hoop stress in the metal surrounding the bore where the wheel needs the beneficial residual stress. The process purposefully avoids cold working of the bore at locations adjacent to high-stress areas and features of the wheel, where cold working in such locations could negatively impact the wheel's overall life.

In one embodiment described herein, a cold-working process comprises the steps of:

providing a centrifugal compressor wheel fabricated of a ductile metal having a tensile yield strength, the compressor wheel comprising a hub and a plurality of blades joined to the hub and extending radially outwardly from the hub, each blade having a blade root fillet where the blade joins with the hub, the compressor wheel having a first face and an opposite second face, the hub of the compressor wheel defining a bore that extends centrally through the hub along a downstream axial direction, the bore having an axial length;

selecting a fractional portion of the axial length of the bore defined between a starting point and an ending point of said fractional portion, wherein the starting point is spaced axially downstream from the first face of the compressor wheel and the ending point is spaced axially downstream from the starting point; and cold working the metal at an inner surface of the bore beyond the tensile yield strength in a hoop-wise direction about the bore, along only said fractional portion of the bore, so as to induce compressive residual hoop stresses in the metal adjacent the inner surface along said fractional portion.

In some embodiments, the cold working step comprises applying radially outward pressure on the inner surface of the bore along said fractional portion only. This can be accomplished mechanically in some embodiments, such as by using a mechanical tool to apply the radially outward pressure on the inner surface of the fractional portion of the bore. For example, the cold working step can comprise axially drawing the tool through the bore along the downstream axial direction, the tool having a diameter that exceeds an initial diameter of the fractional portion of the bore before the cold working step. Various mechanical tools can be employed, non-limiting examples of which include a radially expandable mandrel that can be triggered at the desired location along the bore, after which the expanded mandrel is then drawn axially along the bore to cold work the selected lengthwise portion of the bore, or alternatively a split sleeve and mandrel, wherein the split sleeve is located in the selected bore portion for treatment and the mandrel is pulled through the sleeve to expand the sleeve radially outwardly and thereby cold work the bore portion.

In some embodiments, the bore can have a counterbore extending from the first face of the compressor wheel to the starting point of the fractional portion of the bore, the counterbore having a diameter exceeding the initial diameter of the fractional portion of the bore and exceeding the diameter of the tool. The cold working step then can comprise disposing the tool (for example, an expandable mandrel) in the counterbore and then drawing the tool along the downstream axial direction through the fractional portion of the bore.

As alternatives to the use of mechanical tools, cold working of the selected bore portion can be accomplished by non-mechanical means (non-limiting examples of which can include laser treatment of the inner bore surface, or chemical treatment of the inner bore surface).

The present invention can be applied to centrifugal compressor wheels of various types and configurations, including both single-impeller and twin-impeller wheels. In the case of a twin-impellers wheel, the wheel can include a first impeller and a second impeller arranged back-to-back, the first impeller defining the first face and the second impeller defining the second face of the compressor wheel. In this case, the bore can include a first counterbore extending from the first face of the compressor wheel to the starting point of the fractional portion of the bore and can include a second counterbore extending from the ending point of the fractional portion of the bore to the second face of the compressor wheel. The first and second counterbores each can have a diameter exceeding the initial diameter of the fractional portion of the bore before the cold working step.

The present disclosure also describes a compressor wheel resulting from the cold working process. In accordance with one embodiment, a centrifugal compressor wheel fabricated of a ductile metal having a tensile yield strength comprises a hub and a plurality of blades joined to the hub and extending radially outwardly from the hub, each blade having a blade root fillet where the blade joins with the hub, the compressor wheel having a first face and an opposite second face, the hub of the compressor wheel defining a bore that extends centrally through the hub along a downstream axial direction, the bore having an axial length. The compressor wheel includes a cold-worked zone of residual compressive hoop stresses in a relaxed state of the compressor wheel, said cold-worked zone extending radially outwardly from an inner surface of the bore, and wherein said cold-worked zone extends axially along only a fractional portion of the axial length of the bore, between a starting point and an ending point of the fractional portion, wherein the starting point is axially spaced downstream from the first face of the compressor wheel and the ending point is spaced axially downstream from the starting point.

BRIEF DESCRIPTION OF THE DRAWINGS

Having described the present disclosure in general terms, reference will now be made to the accompanying drawing (s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention (s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
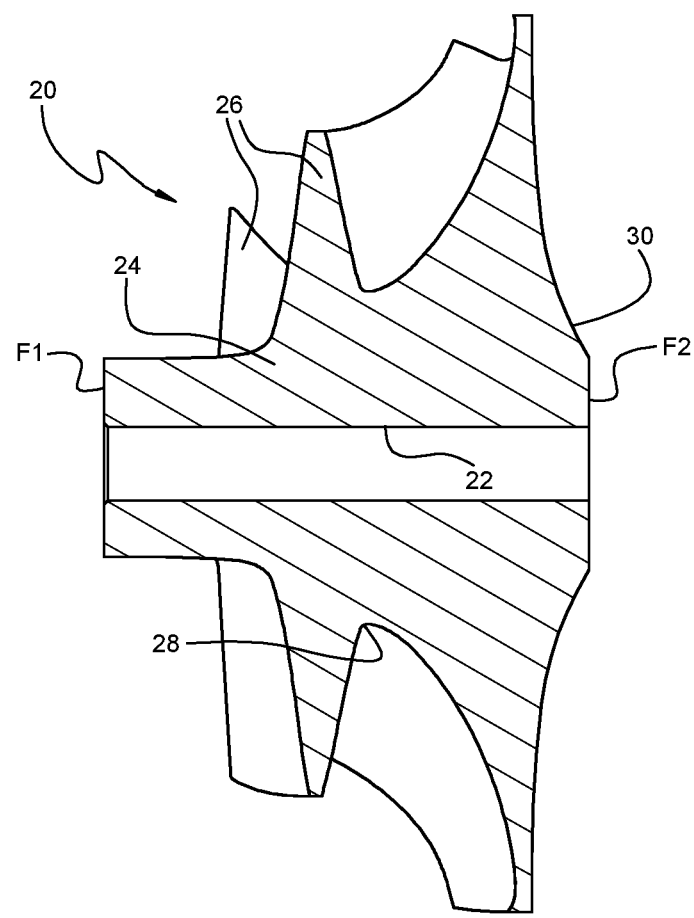
FIG. 1 is a cross-sectional view through a compressor wheel prior to a cold working process in accordance with embodiments of the invention.

FIG. 1 illustrates a single-impeller compressor wheel 20 of a first type to which a process in accordance with the invention may be applied. The wheel includes a cylindrical bore 22 passing centrally through the wheel. The wheel comprises a hub 24 to which a plurality of blades 26 are joined, the blades extending generally radially outwardly from the hub. Where the blades 26 join with the hub 24, there are blade root fillets 28 (see also FIG. 2) that effect a blended or smooth transition between the generally radially extending airfoil surfaces of the blades and the generally circumferentially extending outer surface of the hub. The shape of the hub 24 in a centrifugal compressor wheel is such that with increasing axial distance from the nose of the wheel (in the left-to-right direction in FIG. 1), the hub increases in radius and hence the mass of the wheel per unit length increases toward the back disk 30 of the wheel.

The mass per unit of axial length toward the back disk 30 of the wheel is relatively high, which induces a greater magnitude of cyclic tensile stresses in the bore 22 in that location, relative to the nose area of the wheel where the mass per unit length is smaller. The life-limiting mode of a centrifugal compressor wheel typically is a low-cycle fatigue (LCF) failure mode emanating from a crack that starts at or near the inner surface of the bore of the wheel, generally somewhere in the lengthwise portion of the bore where the mass concentration is relatively high. The present invention aims to mitigate the LCF stresses in the bore so as to extend the LCF life of a centrifugal compressor wheel.

With reference to FIGS. 2 through 6, a first embodiment of a process in accordance with the invention is described for a single-impeller wheel of the type shown in FIG. 1. The process entails cold working of the inner surface of the bore to stress the material beyond its elastic yield strength, and thereby induce residual compressive hoop stresses in the material of the wheel in a zone extending from the inner surface of the bore and radially outwardly for a distance that depends on various factors such as the amount of plastic deformation induced, the dimensions of the bore, the material properties, etc.

Figure 2:
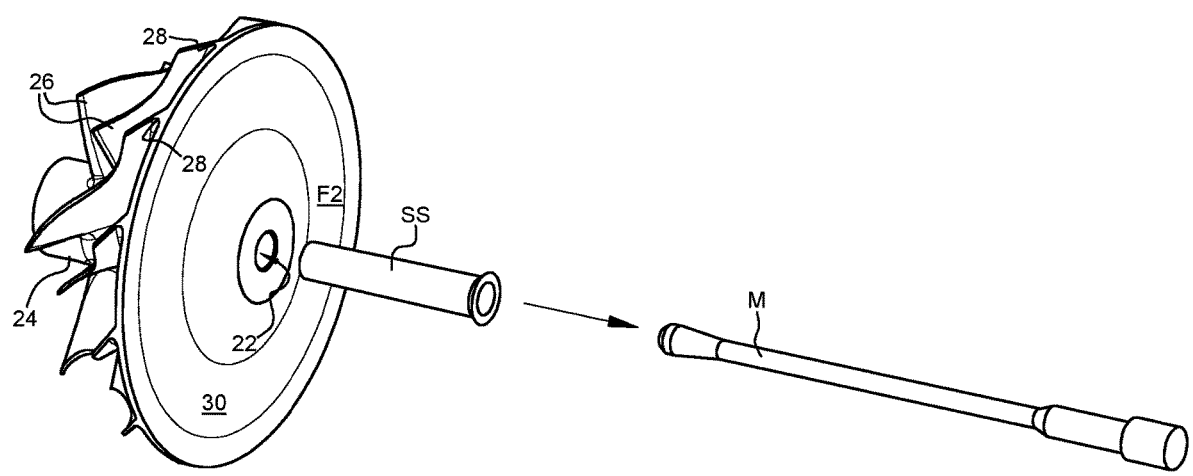
FIG. 2 is an exploded view of a compressor wheel and a mechanical tool, comprising a mandrel surrounded by a split sleeve, for cold working a portion of the bore of the wheel in accordance with an embodiment of the invention.

Thus, as illustrated in FIG. 2, the process in the illustrated embodiment employs a mechanical tool T for effecting the cold working. The tool comprises a split sleeve SS and a mandrel M disposed within the sleeve and axially movable therein. In accordance with the invention, cold working is not performed along the entire axial length of the bore 22. Rather, a fractional portion FP of the length of the bore is selected for cold working; cold working is not performed on any region(s) outside this fractional portion. Thus, the fractional portion FP for cold working is defined between a starting point A and an ending point Z. The starting point A is spaced axially downstream from a first (upstream) face F1 of the wheel, and the ending point is spaced axially downstream from the starting point. The ending point can be at the opposite second (downstream) face F2 of the wheel (i.e., the back disk 30), or it can be spaced some distance upstream of the second face. Thus, the mechanical tool T is configured and operated so that it will cold work only the selected fractional portion FP of the bore.

Figure 3:
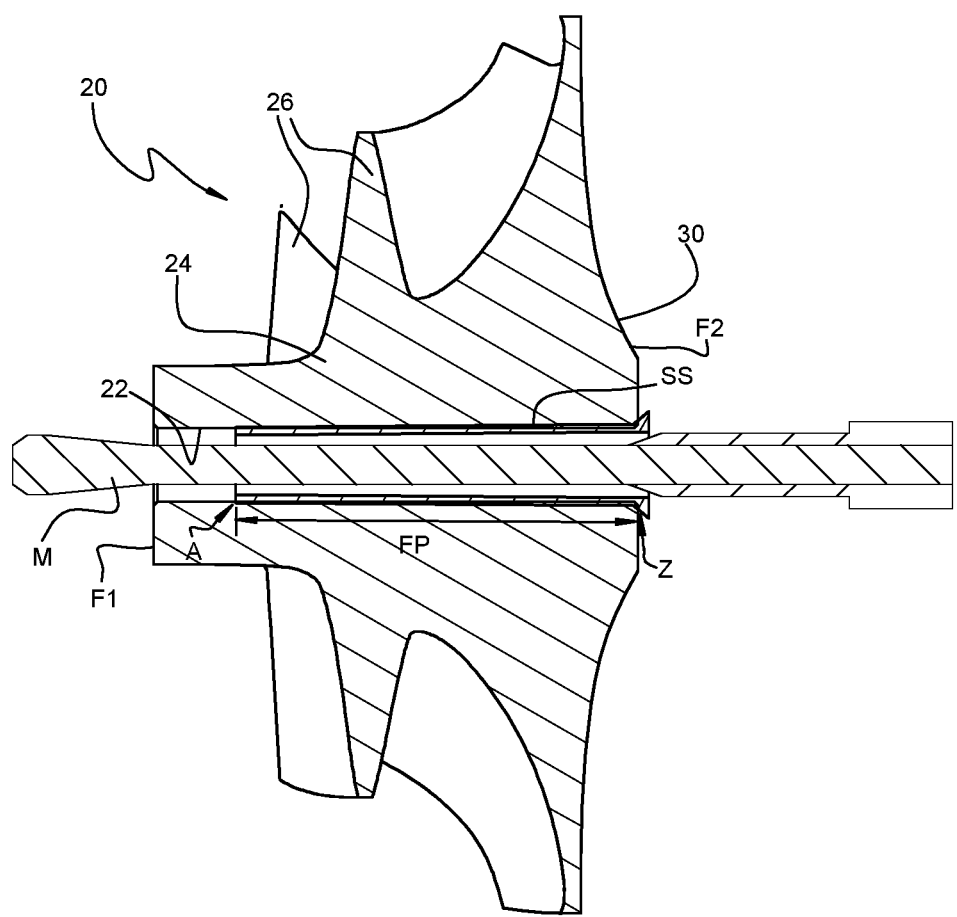
FIG. 3 is a cross-sectional view through the wheel and mechanical tool of FIG. 2 after the tool has been inserted into the bore of the wheel but before the tool is activated to cold work a portion of the bore.
Figure 4:
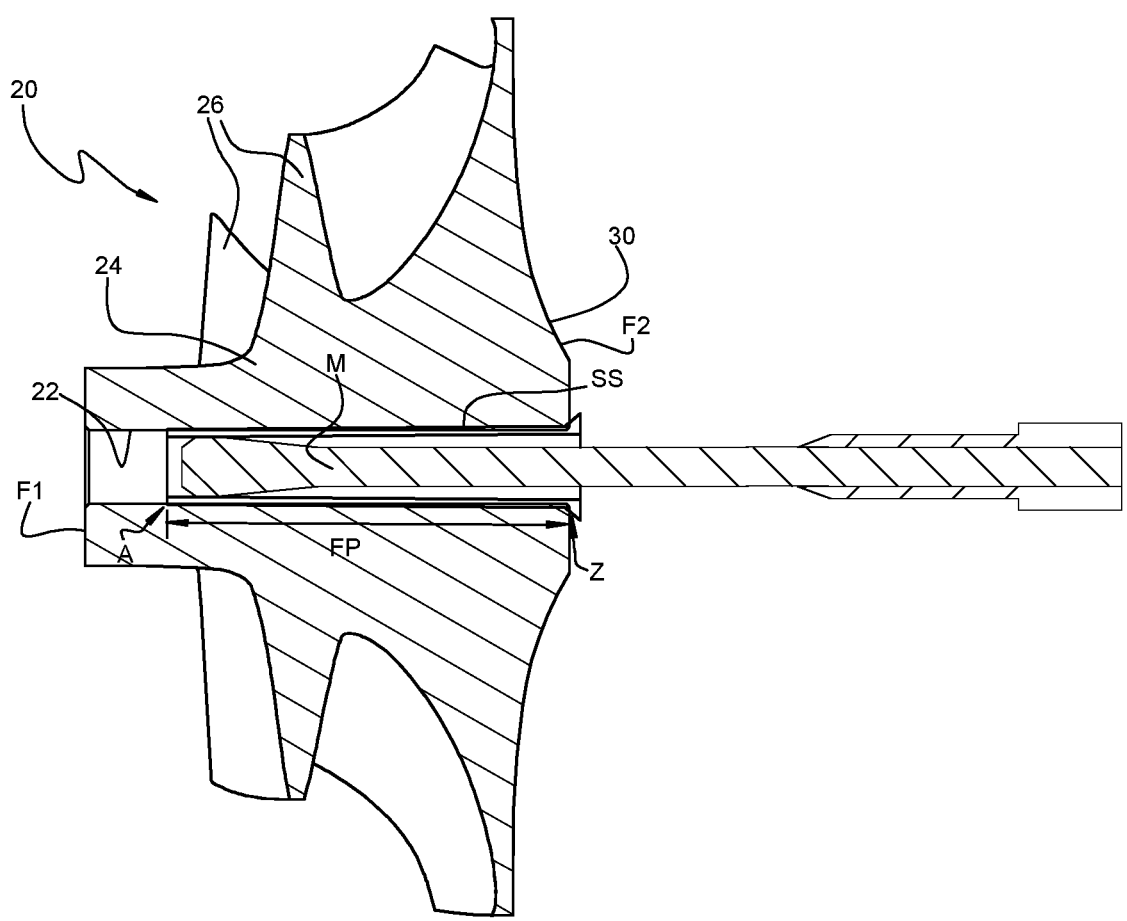
FIG. 4 is a cross-sectional view similar to FIG. 3, showing the mandrel being drawn axially through the split sleeve, which is disposed within only a portion of the bore where cold working of the bore is desired.

With reference to FIG. 3, the wheel is shown with the tool T installed within the bore 22 but prior to the initiation of the cold working process. The split sleeve SS extends only partway along the bore 22, terminating at a point that is axially spaced downstream of the first face F1 of the wheel. FIG. 4 then illustrates a step of the process wherein the mandrel M is drawn axially downstream within the split sleeve SS. The mandrel diameter is larger than the relaxed inside diameter of the split sleeve, and hence when the enlarged mandrel begins to enter the end of the split sleeve, the sleeve is force to expand in diameter, which in turn forces the inner surface of the bore 22 to expand in diameter. This causes the ductile metal of the wheel to yield past its elastic tensile yield strength in the hoop-wise direction. This plastic yielding occurs over a zone surrounding the bore.

The zone of plastic yielding occupies substantially only the fractional portion FP of the bore 22 in which the split sleeve is disposed. Thus, the portion of the bore 22 to the left of the split sleeve SS in FIG. 4 is not cold worked and does not have a zone of plastic yielding.

Figure 5:
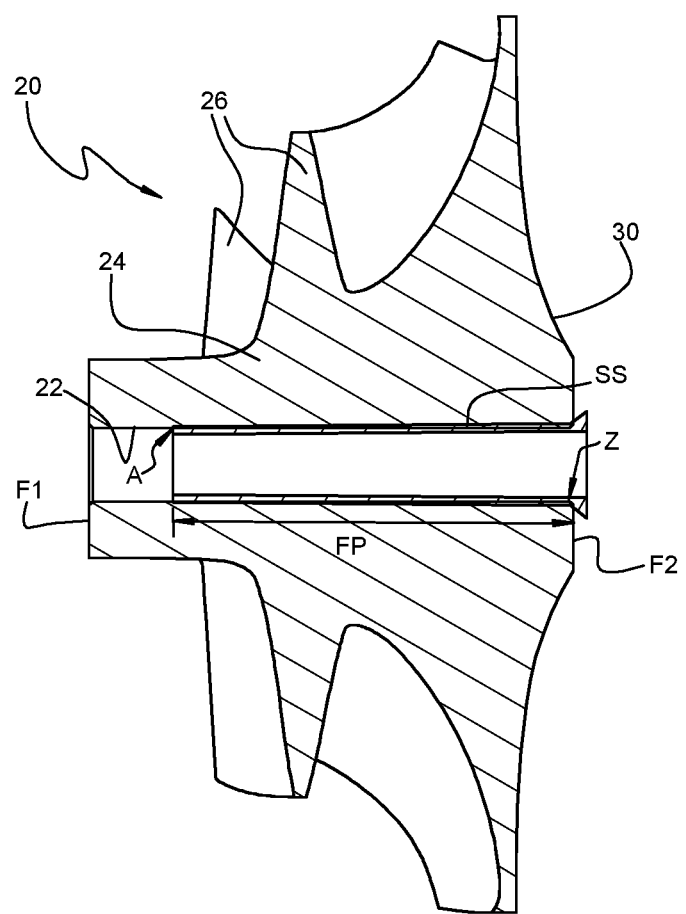
FIG. 5 is a cross-sectional view similar to FIG. 4, after the mandrel has been fully drawn through and removed from the bore and sleeve.
Figure 6:
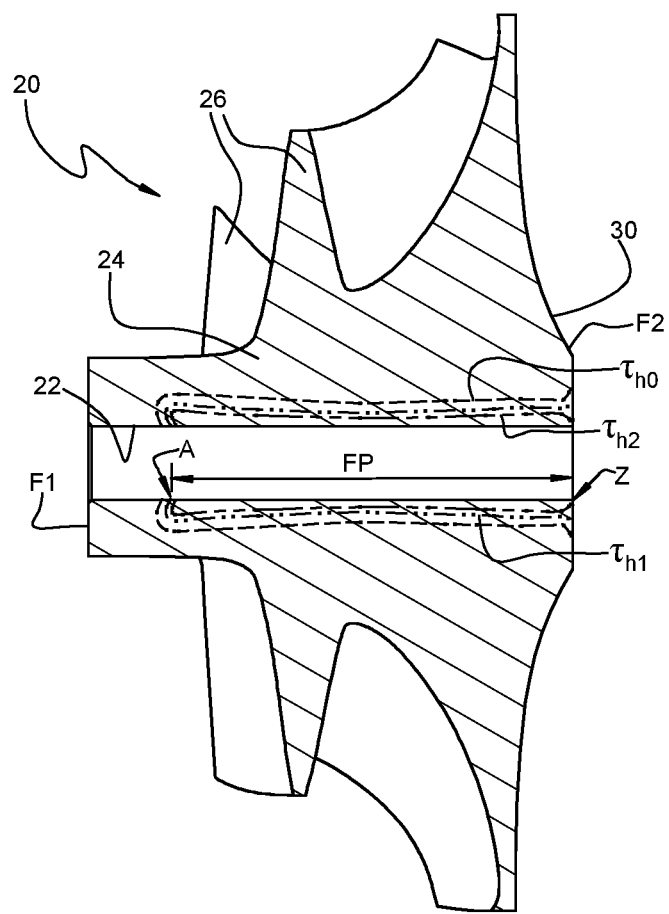
FIG. 6 is a cross-sectional view of the compressor wheel of FIGS. 1-5, after the split sleeve has been removed to complete the cold working process.

FIG. 5 depicts the wheel 20 after the mandrel M has been fully drawn along and out from the split sleeve SS, and FIG. 6 shows the result of the next step wherein the split sleeve is removed from the bore. The resulting wheel 20 has a zone of residual compressive hoop stresses extending from the inner surface of the bore 22 and for some radial distance outwardly from the bore, but only along the fractional portion FP of the bore that was cold worked. More particularly, as shown in FIG. 6, a hoop stress contour line $\tau_{h2}$ is depicted, representing a contour line of constant compressive (negative in sign) hoop stress of relatively high magnitude. Farther radially outward from that contour line is a hoop stress contour line $\tau_{h1}$ representing a contour line of constant compressive hoop stress having a magnitude less than that of the $\tau_{h2}$ contour line. Still farther radially outwardly from the $\tau_{h1}$ contour line is a contour line designated as $\tau_{h0}$ because along this contour line the hoop stress is equal to zero, meaning that there is neither compressive nor tensile hoop stress. Radially outwardly of the $\tau_{h0}$ line, the hoop stress becomes positive, i.e., tensile. Thus, the zone of the wheel radially inward of the $\tau_{h0}$ contour line is a zone of residual compressive hoop stress. The compressive hoop stress reaches a maximum magnitude at the inner surface of the bore 22 and the magnitude diminishes with increasing radial distance from the inner surface of the bore.

An important aspect of the process of the invention is selection of the fractional portion FP of the bore 22 for cold working. The methodology employed to make this selection entails the following aspects: The starting point A of the fractional portion for cold working must not be too close to the first face F1 of the wheel, because if the cold-worked portion of the bore extends too far toward the first face, the cold working can give rise to deleterious residual tensile stresses in the leading edge blade root fillets. On the other hand, the cold-worked portion FP of the bore should cover the entire area of potential LCF hub type failure of the wheel. There are thus two contrary constraints: a longer treated portion of the bore would be favorable for ensuring that the entire area of potential LCF hub type failure is covered; however, a shorter treated portion would be favorable for avoiding the danger of inducing deleterious residual tensile stresses in the leading edge blade root fillets. In accordance with the invention, at least in some embodiments, the fractional portion FP for cold working is selected by taking into account wheel hub maximum von Mises stress resulting from blade leading edge fillet loading and ensuring that it is sufficiently below material yield strength. Essentially, the cold worked portion FP is selected so that it covers the part of the bore length that is susceptible to LCF hub type failure, while meeting this maximum von Mises stress criterion.

Figure 7:
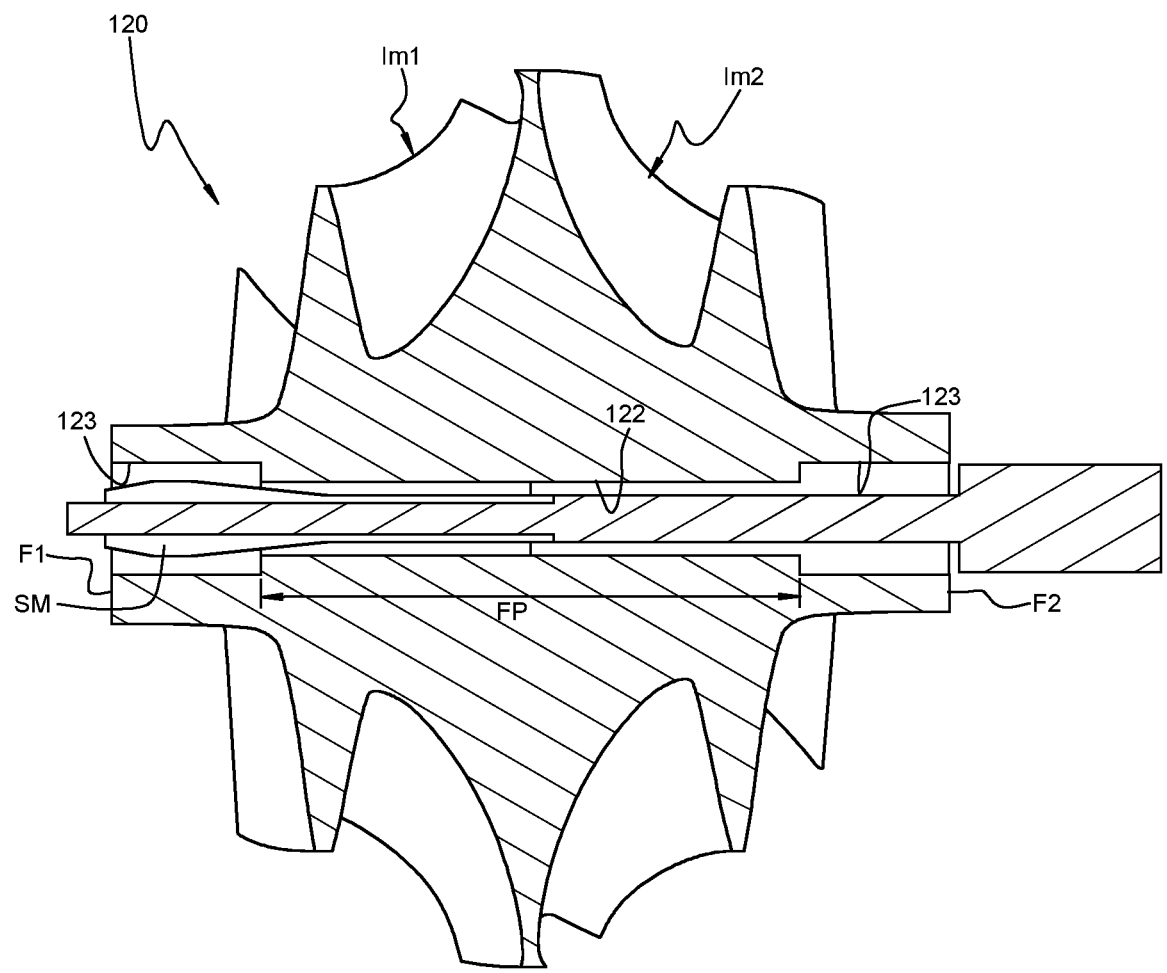
FIG. 7 is a cross-sectional view through a twin-impeller compressor wheel having a mechanical tool disposed therein, preparatory to performing a cold working operation on a portion of the length of the bore in accordance with another embodiment of the invention.

Another embodiment of the invention, depicted in FIG. 7, can include a twin-impeller wheel 120 comprising a first impeller Im1 and a second impeller Im2 arranged in a back-to-back configuration and sharing the same bore 122, and having clearance counterbores 123 adjacent each nose for the cold working process. This embodiment advantageously can be performed with an expandable split mandrel SM. In each counterbore 123, the expanded mandrel does not perform any cold working of the bore. After cold working has been performed on the fractional portion FP of the bore 122, a final reaming for the final bore dimension(s) can conclude the process.

Figure 8:
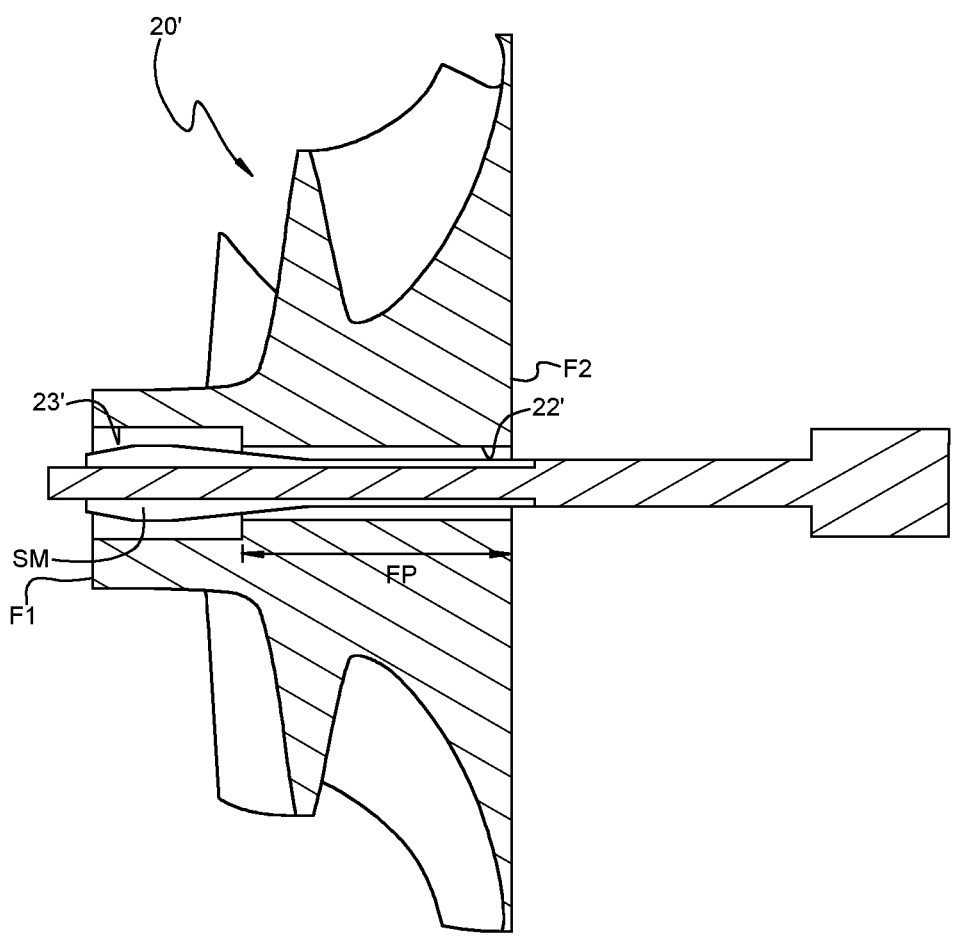
FIG. 8 is a cross-sectional view through a compressor wheel generally like that of FIG. 1 but including a counterbore, prior to a cold working process in accordance with embodiments of the invention.

In accordance with another embodiment of the invention illustrated in FIG. 8, a single-impeller compressor wheel 20' is similar to that of FIG. 1, except that the bore 22' includes a clearance bore 23' adjacent the "nose" side (the left side in FIG. 8) of the bore of the wheel. The clearance bore has a larger bore diameter than the fractional portion FP of the bore to be cold worked. The clearance bore has a defined length. The expandable mandrel is staged and triggered at a position inside the clearance bore where cold working is not desired. At this step, the mandrel is pulled to the right through the section of the bore that is designed to receive the cold working. The result is cold working in the portion FP of the bore that has the highest bore stresses and therefore can positively impact bore life, while avoiding harmful overlapping stresses at the blade root fillets nearest to the nose of the impeller. The overlapping stresses described herein are related to the leading edge root fillets of the impeller blades and the tensile stresses that result from the cold working process in proximity of these leading edge root fillets. In general, such harmful overlapping stresses can be avoided by spacing the starting point of the treated bore portion axially downstream from the leading edge blade root fillets.

Advantageously, wheels processed in accordance with embodiments of the invention can also undergo a post-reaming operation to remove axial ridges (residual artifacts that result from the cold working process) and thereby assure uniformity of bore diameter and controlled surface finish along the bore length to aid in minimizing crack initiation.

There are trade-offs of cold working using a mandrel-and-split sleeve technique versus an expandable mandrel without sleeve technique. However, in both cold working methods, the invention addresses the primary need of the invention: induction of beneficial residual compressive hoop stresses in the bore through cold working techniques, and localizing the area of treatment to a partial length of the bore that has the highest hoop stresses.

Another (non-illustrated) embodiment could include a final bore with a threaded length in the nose area of the bore for direct attachment to the shaft of a rotor, if the nose were long enough to allow sufficient distance from the treated bore area to the threaded region of the bore at the nose.

Aspects of the invention described herein include without limitation:

Aspect 1: A cold-working process comprising the steps of:
providing a centrifugal compressor wheel fabricated of a ductile metal having a tensile yield strength, the compressor wheel comprising a hub and a plurality of blades joined to the hub and extending radially outwardly from the hub, each blade having a blade root fillet where the blade joins with the hub, the compressor wheel having a first face and an opposite second face, the hub of the compressor wheel defining a bore that extends centrally through the hub along a downstream axial direction, the bore having an axial length;
selecting a fractional portion of the axial length of the bore defined between a starting point and an ending point of said fractional portion, wherein the starting point is spaced axially downstream from the first face of the compressor wheel and the ending point is spaced axially downstream from the starting point; and
cold working the metal at an inner surface of the bore beyond the tensile yield strength in a hoop-wise direction about the bore, along only said fractional portion of the bore, the bore not being cold worked outside said fractional portion, so as to induce compressive residual hoop stresses in the metal adjacent the inner surface along said fractional portion.

Aspect 2: The cold-working process as in Aspect 1, wherein the starting point is spaced axially downstream from leading edges of the blade root fillets.

Aspect 3: The cold-working process as in Aspect 1, wherein the cold working step comprises applying radially outward pressure on the inner surface of the bore along said fractional portion only.

Aspect 4: The cold-working process as in Aspect 3, wherein the cold working step comprises using a mechanical tool to apply the radially outward pressure on the inner surface of the fractional portion of the bore.

Aspect 5: The cold-working process as in Aspect 4, wherein the cold working step comprises axially drawing the tool through the bore along the downstream axial direction, the tool having a diameter that exceeds an initial diameter of the fractional portion of the bore before the cold working step.

Aspect 6: The cold-working process as in Aspect 5, wherein the providing step further comprises providing the bore to have a counterbore located upstream of the starting point of the fractional portion of the bore, the counterbore having a diameter exceeding the initial diameter of the fractional portion of the bore and exceeding the diameter of the tool, and wherein the cold working step comprises disposing the tool in the counterbore and then drawing the tool along the downstream axial direction through the fractional portion of the bore.

Aspect 7: The cold working process as in Aspect 4, wherein the mechanical tool comprises a split sleeve that surrounds a mandrel, the split sleeve having an axial length corresponding to the axial length of the fractional portion of the bore, wherein the cold working step comprises disposing the split sleeve within the fractional portion of the bore and drawing the mandrel axially through the split sleeve to expand the split sleeve radially outwardly.

Aspect 8: The cold working process as in Aspect 1, wherein the providing step further comprises providing the compressor wheel as a twin-impeller having a first impeller and a second impeller arranged back-to-back, the first impeller defining the first face and the second impeller defining the second face of the compressor wheel, and providing the bore to have a first counterbore adjacent the first face of the compressor wheel and extending to the starting point of the fractional portion of the bore and to have a second counterbore extending from the ending point of the fractional portion of the bore toward the second face of the compressor wheel, the first and second counterbores each having a diameter exceeding an initial diameter of the fractional portion of the bore before the cold working step.

Aspect 9: The cold working process as in Aspect 8, wherein the cold working step comprises using a mechanical tool to apply the radially outward pressure on the inner surface of the fractional portion of the bore.

Aspect 10: The cold-working process as in Aspect 9, wherein the cold working step comprises axially drawing the tool through the bore, the tool having a diameter that exceeds the initial diameter of the fractional portion of the bore before the cold working step.

Aspect 11: The cold-working process as in Aspect 9, the first and second counterbores each having a diameter exceeding the initial diameter of the fractional portion of the bore and exceeding the diameter of the tool, and wherein the cold working step comprises disposing the tool in one of the first and second counterbores and then drawing the tool along the downstream axial direction through the fractional portion of the bore until the tool reaches the other of the first and second counterbores.

Aspect 12: A centrifugal compressor wheel fabricated of a ductile metal having a tensile yield strength, the compressor wheel comprising a hub and a plurality of blades joined to the hub and extending radially outwardly from the hub, each blade having a blade root fillet where the blade joins with the hub, the compressor wheel having a first face and an opposite second face, the hub of the compressor wheel defining a bore that extends centrally through the hub along a downstream axial direction, the bore having an axial length, the compressor wheel including a cold-worked zone of residual compressive hoop stresses in a relaxed state of the compressor wheel, said cold-worked zone extending radially outwardly from an inner surface of the bore, and wherein said cold-worked zone extends axially along only a fractional portion of the axial length of the bore, between a starting point and an ending point of the fractional portion, wherein the starting point is axially spaced downstream from the first face of the compressor wheel and the ending point is spaced axially downstream from the starting point.

Aspect 13: The centrifugal compressor wheel as in Aspect 12, wherein the starting point is spaced axially downstream from leading edges of the blade root fillets.

Aspect 14: The centrifugal compressor wheel as in Aspect 12, wherein the wheel includes a counterbore located upstream of the starting point of the fractional portion of the bore.

Aspect 15: The centrifugal compressor wheel as in Aspect 12, comprising a twin-impeller wheel having a first impeller and a second impeller arranged back-to-back, the first impeller defining the first face and the second impeller defining the second face of the compressor wheel, wherein the bore comprises a first counterbore adjacent the first face of the compressor wheel and extending to the starting point of the fractional portion of the bore and a second counterbore extending from the ending point of the fractional portion of the bore toward the second face of the compressor wheel.

Aspect 16: An article produced by a process comprising the steps of:
providing a centrifugal compressor wheel fabricated of a ductile metal having a tensile yield strength, the compressor wheel comprising a hub and a plurality of blades joined to the hub and extending radially outwardly from the hub, each blade having a blade root fillet where the blade joins with the hub, the compressor wheel having a first face and an opposite second face, the hub of the compressor wheel defining a bore that extends centrally through the hub along a downstream axial direction, the bore having an axial length;
selecting a fractional portion of the axial length of the bore defined between a starting point and an ending point of said fractional portion, wherein the starting point is spaced axially downstream from the first face of the compressor wheel and the ending point is spaced axially downstream from the starting point; and
cold working the metal at an inner surface of the bore beyond the tensile yield strength in a hoop-wise direction about the bore, along only said fractional portion of the bore, the bore not being cold worked outside said fractional portion, so as to induce compressive residual hoop stresses in the metal adjacent the inner surface along said fractional portion, such that the compressor wheel comprises a cold-worked zone of residual compressive hoop stresses in a relaxed state of the compressor wheel, said cold-worked zone extending radially outwardly from an inner surface of the bore and extending axially along said fractional portion of the axial length of the bore.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A cold-working process comprising the steps of:
   providing a centrifugal compressor wheel fabricated of a ductile metal having a tensile yield strength, the compressor wheel comprising a hub and a plurality of blades joined to the hub and extending radially outwardly from the hub, each blade having a blade root fillet where the blade joins with the hub, said blade root fillets each having a leading edge, the compressor wheel having a first face and an opposite second face, the hub of the compressor wheel defining a bore that extends centrally through the hub along a downstream axial direction, the bore having an axial length;
   selecting a fractional portion of the axial length of the bore defined between a starting point and an ending point of said fractional portion, wherein the starting point is spaced axially downstream from the leading edges of the blade root fillets and the ending point is spaced axially downstream from the starting point, and providing the bore to have a counterbore located upstream of the starting point of the fractional portion of the bore, the counterbore having a diameter exceeding an initial diameter of the fractional portion of the bore;
   disposing a mechanical tool in the counterbore, the tool having a diameter that exceeds the initial diameter of the fractional portion of the bore; and
   cold working the metal at an inner surface of the bore beyond the tensile yield strength in a hoop-wise direction about the bore, along only said fractional portion of the bore, by drawing the tool along the downstream axial direction through the fractional portion of the bore, the bore not being cold worked outside said fractional portion, so as to induce compressive residual hoop stresses in the metal adjacent the inner surface along said fractional portion.

2. The cold working process of claim 1, wherein the mechanical tool comprises a split sleeve that surrounds a mandrel, the split sleeve having an axial length corresponding to the axial length of the fractional portion of the bore, wherein the cold working step comprises disposing the split sleeve within the fractional portion of the bore and drawing the mandrel axially through the split sleeve to expand the split sleeve radially outwardly.

3. The cold working process of claim 1, wherein the providing step further comprises providing the compressor wheel as a twin-impeller having a first impeller and a second impeller arranged back-to-back, the first impeller defining the first face and the second impeller defining the second face of the compressor wheel, wherein the counterbore is located adjacent the first face of the compressor wheel and extends to the starting point of the fractional portion of the bore, and further providing the bore to have a second counterbore extending from the ending point of the fractional portion of the bore toward the second face of the compressor wheel, the second counterbore having a diameter exceeding an initial diameter of the fractional portion of the bore before the cold working step.

4. An article produced by a process comprising the steps of:
   providing a centrifugal compressor wheel fabricated of a ductile metal having a tensile yield strength, the compressor wheel comprising a hub and a plurality of blades joined to the hub and extending radially outwardly from the hub, each blade having a blade root fillet where the blade joins with the hub, said blade root fillets each having a leading edge, the compressor wheel having a first face and an opposite second face, the hub of the compressor wheel defining a bore that extends centrally through the hub along a downstream axial direction, the bore having an axial length;
   selecting a fractional portion of the axial length of the bore defined between a starting point and an ending point of said fractional portion, wherein the starting point is spaced axially downstream from the leading edges of the blade root fillets and the ending point is spaced axially downstream from the starting point, and providing the bore to have a counterbore located upstream of the starting point of the fractional portion of the bore, the counterbore having a diameter exceeding an initial diameter of the fractional portion of the bore;
   disposing a mechanical tool in the counterbore, the tool having a diameter that exceeds the initial diameter of the fractional portion of the bore; and
   cold working the metal at an inner surface of the bore beyond the tensile yield strength in a hoop-wise direction about the bore, along only said fractional portion of the bore, by drawing the tool along the downstream axial direction through the fractional portion of the bore, the bore not being cold worked outside said fractional portion, so as to induce compressive residual hoop stresses in the metal adjacent the inner surface along said fractional portion.

* * * * *